Dec. 7, 1948.  O. CARLSON  2,455,853
SAW BLADE AND HANDLE
Filed Feb. 1, 1946
Fig. 1
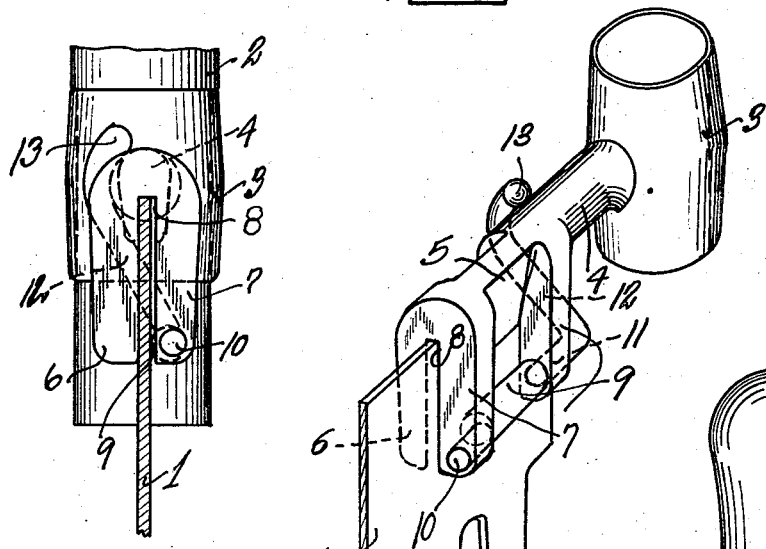
Fig. 2
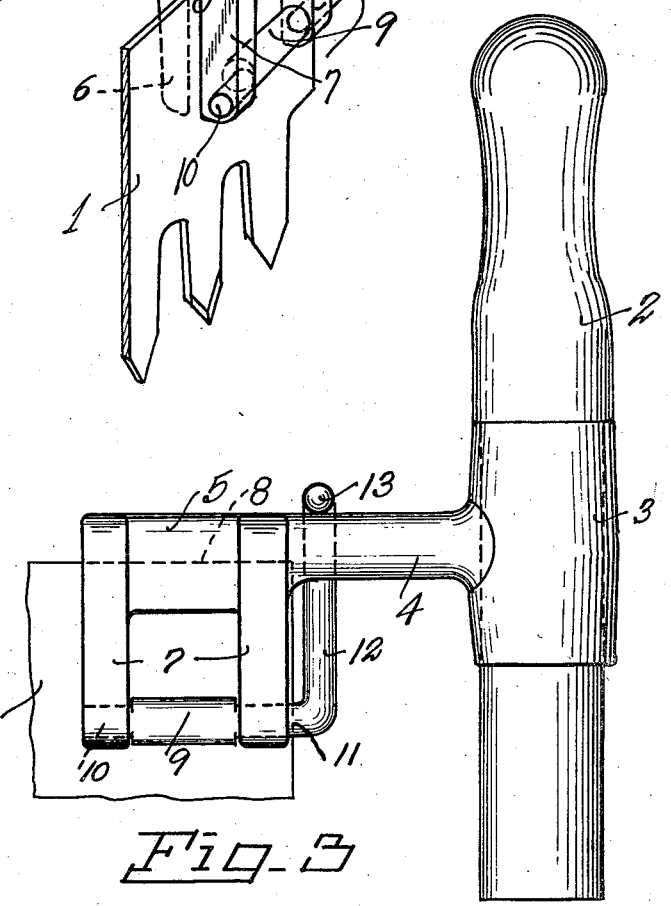
Fig. 3
INVENTOR
Oscar Carlson
BY
Glenn L. Fish
ATTORNEY Patented Dec. 7, 1948

2,455,853

UNITED STATES PATENT OFFICE 2,455,853

SAW BLADE AND HANDLE

Oscar Carlson, Spokane, Wash.

Application February 1, 1946, Serial No. 644,943

1 Claim. (Cl. 145—110)

This invention relates to a saw handle and more particularly to a handle for a cross cut saw of the type used for felling trees and for cutting the trunks of felled trees into logs.

When a tree is being felled it often happens that the tree will tend to tilt and cause the saw to become pinched and it is then necessary to remove the saw from a cut being formed through a tree. This is done by drawing the saw longitudinally through the cut and in order to do so it is necessary to remove the handle at one end of the saw blade. Since the handles are usually secured to the blade by screws or bolts which pass through the handle and the blade, the handle can not be quickly detached from the blade, and it is therefore one object of the invention to provide a handle so held to the blade that the handle may be quickly released and removed from the saw blade.

Another object of the invention is to provide a handle having its socket provided with an arm projecting laterally from it and carrying depending legs which straddle the blade, one set of legs carrying a clamping member which is rotatably mounted and has a lever by means of which it may be turned into and out of position for gripping a side face of the saw blade.

Another object of the invention is to provide a clamp with a handle or lever so disposed that its free end may be quickly pressed upon and the handle or lever moved to rotate the clamp to a releasing position when necessary.

Another object of the invention is to provide a saw handle so formed that it is of simple construction, very strong, and not liable to become broken.

The invention is illustrated in the accompanying drawings wherein:

Fig. 1 is a perspective view of an end portion of a saw blade having a handle of the improved construction carried thereby.

Fig. 2 is a view showing the saw blade in section and the improved handle in elevation.

Fig. 3 is a side view of the improved handle and a portion of the saw blade.

The saw blade 1 represents a cross cut saw of conventional size and formation and while a handle of the improved construction has been shown applied at one end of the blade it will be understood that both ends of the blade will be provided with a handle so that the blade may be operated by two workmen in the usual manner.

The handle bar 2 passes through a socket 3 formed of strong metal and from this socket extends an arm 4 which is formed integral with the socket or welded thereto. The free end portion 5 of the shank or arm 4 is of reduced thickness and flattened at opposite sides and at opposite ends of this flattened portion are depending fingers or jaws 6 and 7 spaced from each other by spaces which lead from inner and outer ends of a slot 8 formed longitudinally of the flattened portion 5 and into which the saw blade fits.

A cam or rotary jaw 9 having eccentrically located trunnions or shafts 10 and 11 extending from its ends is located between the fingers or legs 7 and the shafts or trunnions are rotatably mounted through lower ends of the legs 7 to rotatably mount the jaw and permit it to be turned into and out of position to engage a side face of the blade 1 and hold the blade in tight binding engagement with the jaws 6. A lever 12 extends laterally from the shaft 11 and has its free end portion 13 curved longitudinally so that when the cam or jaw 9 is turned to the clamping position the curved end portion of the lever will have close fitting engagement with the shank 4. Since the lever arm extends upwardly back of the rear or inner legs 6 and 7 and its free end portion fits close against the shank it will be out of the way and not liable to be struck and accidentally moved to turn the cam 9 to the releasing position. When the kerf being cut through a tree trunk starts to close and it is desired to quickly remove the saw blade from the kerf it is merely necessary to place a thumb against the free end of the lever 12 and apply pressure to swing the lever away from the shank, and the cam or jaw 9 will be turned and moved away from the confronting face of the saw blade. The saw blade will thus be freed and may be pulled longitudinally from the kerf by one workman while another workman holds the handle bar 2 of the handle which has been freed from the blade.

Having thus described the invention, what is claimed is:

A saw blade, and a handle for said saw blade comprising a handle engaging member, a shank projecting from said handle engaging member and having its outer end portion formed with a longitudinally extending groove, said groove extending from the outer end of said shank inwardly for a portion of its length, a pair of parallel spaced depending legs at each end of the grooved outer end portion of the shank, the legs of each pair being disposed at opposite sides of the groove, said saw blade being disposed between the legs of each pair of legs and having an edge portion fitting snugly in the groove, a cam between the legs at one side of the grove, said cam having eccentric coaxial shafts extending from its ends, said shafts being rotatably mounted in the legs at the said one side of the groove, the cam being of a diameter adapting it when rotated to engage the confronting side face of the saw blade and urge said blade against the legs at the other side of the groove, the inner one of said shafts extending through and projecting rearwardly from the leg in which it is mounted and its projecting end portion being formed with a laterally extending lever arm for turning the cam into and out of engagement with the confronting side face of the saw blade, and said lever being of a length adapting it to extend across the shank and having its free end portion curved longitudinally and disposed in close fitting engagement with a side portion of the shank rearwardly of the inner pair of legs when said lever is moved to a position disposing the cam in engagement with the saw blade.

OSCAR CARLSON.

REFERENCES CITED

The following references are of record in the file of this patent:

UNITED STATES PATENTS

| Number | Name | Date |
|---|---|---|
| 633,420 | Brown | Sept. 19, 1899 |
| 813,036 | Cardwell | Feb. 20, 1906 |
| 1,414,608 | Watson | May 2, 1922 |